(12) United States Patent
Lee

(10) Patent No.: US 7,420,642 B2
(45) Date of Patent: *Sep. 2, 2008

(54) ARRAY SUBSTRATE FOR IN-PLANE SWITCHING MODE LIQUID CRYSTAL DISPLAY DEVICE

(75) Inventor: Yun Bok Lee, Seoul (KR)

(73) Assignee: LG Display Co., LCD, Seoul (KR)

( * ) Notice: Subject to any disclaimer, the term of this patent is extended or adjusted under 35 U.S.C. 154(b) by 144 days.

This patent is subject to a terminal disclaimer.

(21) Appl. No.: 11/303,952

(22) Filed: Dec. 19, 2005

(65) Prior Publication Data
US 2006/0139546 A1 Jun. 29, 2006

Related U.S. Application Data

(62) Division of application No. 10/825,433, filed on Apr. 16, 2004, now Pat. No. 7,002,656.

(30) Foreign Application Priority Data
Dec. 11, 2003 (KR) ...................... 10-2003-0090414

(51) Int. Cl.
*G02F 1/1343* (2006.01)
(52) U.S. Cl. ...................................... 349/141
(58) Field of Classification Search .................. 349/141
See application file for complete search history.

(56) References Cited

U.S. PATENT DOCUMENTS

| | | | |
|---|---|---|---|
| 5,069,813 A | 12/1991 | Patel | |
| 5,144,288 A | 9/1992 | Hamada et al. | |
| 5,434,687 A | 7/1995 | Kawata et al. | |
| 5,610,743 A | 3/1997 | Tsai | |
| 5,929,958 A * | 7/1999 | Ohta et al. | 349/141 |
| 5,956,111 A * | 9/1999 | Ohta et al. | 349/141 |
| 5,977,562 A | 11/1999 | Hirakata et al. | 257/72 |
| 6,243,154 B1 | 6/2001 | You et al. | |
| 6,307,216 B1 | 10/2001 | Huh et al. | |
| 6,621,102 B2 | 9/2003 | Hirakata et al. | 257/72 |
| 6,897,930 B2 | 5/2005 | Nakayoshi et al. | |
| 2003/0053020 A1 | 3/2003 | Okada et al. | |
| 2005/0083466 A1 | 4/2005 | Lee et al. | 349/141 |

(Continued)

FOREIGN PATENT DOCUMENTS

GB 2311905 10/1997

(Continued)

*Primary Examiner*—James A Dudek
(74) *Attorney, Agent, or Firm*—McKenna, Long & Aldridge LLP

(57) ABSTRACT

An array substrate for use in an in-plane switching liquid crystal display device includes a plurality of gate lines disposed in a first direction on a substrate; a plurality of data lines disposed in a second direction aslant the gate lines, wherein the gate and data lines have rounded portions and pairs of the gate and data lines define circular pixel regions; a common line disposed in the first direction between the pair of the gate lines; a circular common electrode connected to the common line; a thin film transistor disposed near each crossing of the gate and data lines; and a circular pixel electrode disposed in the circular pixel region, connected to the thin film transistor, and spaced apart from the circular common electrode.

7 Claims, 8 Drawing Sheets

U.S. PATENT DOCUMENTS

| | | | |
|---|---|---|---|
| 2005/0083468 A1 | 4/2005 | Chen et al. | 349/141 |
| 2005/0105033 A1 | 5/2005 | Itou et al. | 349/141 |
| 2005/0117102 A1 | 6/2005 | Park et al. | 349/141 |
| 2005/0128401 A1* | 6/2005 | Lee | 349/139 |
| 2005/0128402 A1 | 6/2005 | Lee | 349/139 |
| 2005/0128404 A1 | 6/2005 | Lee | 349/141 |
| 2005/0128405 A1 | 6/2005 | Lee | 349/141 |
| 2005/0128406 A1* | 6/2005 | Lee | 349/141 |
| 2005/0128407 A1 | 6/2005 | Lee et al. | 349/141 |
| 2005/0128408 A1* | 6/2005 | Lee | 349/141 |
| 2005/0128409 A1* | 6/2005 | Lee | 349/141 |
| 2005/0140896 A1* | 6/2005 | Chae et al. | 349/141 |
| 2005/0206822 A1* | 9/2005 | Lee | 349/141 |
| 2007/0109480 A1* | 5/2007 | Lee | 349/141 |
| 2007/0146607 A1* | 6/2007 | Lee et al. | 349/141 |
| 2007/0165171 A1* | 7/2007 | Lee | 349/139 |

FOREIGN PATENT DOCUMENTS

| | | |
|---|---|---|
| JP | 06-342156 | 12/1994 |
| JP | 09-061812 | 3/1997 |
| JP | 09-325340 | 12/1997 |
| JP | 10-062802 | 3/1998 |
| JP | 2001-154214 | 6/2001 |
| JP | 2002-055357 | 2/2002 |
| JP | 2002-229046 | 8/2002 |
| JP | 2003-167271 | 6/2003 |
| KR | 1999-0058889 | 7/1999 |

* cited by examiner

US 7,420,642 B2

ARRAY SUBSTRATE FOR IN-PLANE SWITCHING MODE LIQUID CRYSTAL DISPLAY DEVICE

This application is a Divisional of application Ser. No. 10/825,433 filed Apr. 16, 2004 now U.S. Pat. No. 7,002,656, which is hereby incorporated by reference as if fully set forth herein. This application claims the benefit of Korean Patent Application No. 2003-0090414, filed on Dec. 11, 2003, which is hereby incorporated by reference as if fully set forth herein.

BACKGROUND OF THE INVENTION

1. Field of the Invention

The present invention relates to liquid crystal display devices. More particularly it relates to liquid crystal display devices implementing in-plane switching (IPS) where an electric field to be applied to liquid crystals is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

LCD devices have wide application in office automation (OA) equipment and video units because they are light, thin and have low power consumption characteristics. The typical liquid crystal display panel has an upper substrate, a lower substrate and a liquid crystal layer interposed there between. The upper substrate, commonly referred to as a color filter substrate, usually includes a common electrode and color filters. The lower substrate, commonly referred to as an array substrate, includes switching elements, such as thin film transistors and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, since the pixel and common electrodes are positioned on the lower and upper substrates, respectively, the electric field induced between them is perpendicular to the lower and upper substrates. However, the conventional LCD devices having the longitudinal electric field have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates. A detailed explanation about operation modes of a typical IPS-LCD panel will be provided referring to FIG. 1.

FIG. 1 is a schematic cross-sectional view illustrating a concept of a related art IPS-LCD panel. As shown in FIG. 1, upper and lower substrates 10 and 20 are spaced apart from each other, and a liquid crystal layer 30 is interposed there between. The upper and lower substrates 10 and 20 are often referred to as an array substrate and a color filter substrate, respectively. On the lower substrate 20 are a common electrode 22 and a pixel electrode 24. The common and pixel electrodes 22 and 24 are aligned parallel to each other. On a surface of the upper substrate 10, a color filter layer (not shown) is commonly positioned in a position between the pixel electrode 24 and the common electrode 22 of the lower substrate 20. A voltage applied to the common and pixel electrodes 22 and 24 produces an electric field 26 through the liquid crystal 32. The liquid crystal 32 has a positive dielectric anisotropy, and thus it aligns parallel to the electric field 26.

Now the description will illustrate the operation of a related art IPS-LCD device. When no electric field is produced by the common and pixel electrodes 22 and 24, i.e., the off state, the longitudinal axes of the liquid crystal (LC) molecules 32 are parallel and form a definite angle with the common and pixel electrodes 22 and 24. For example, the longitudinal axes of the LC molecules 32 are arranged parallel with both the common:and pixel electrodes 22 and 24.

On the contrary, when a voltage is applied to the common and pixel electrodes 22 and 24, i.e., the on state, an in-plane electric field 26 that is parallel to the surface of the lower substrate 20 is produced because the common and pixel electrodes 22 and 24 are on the lower substrate 20. Accordingly, the LC molecules 32 are re-arranged to bring their longitudinal axes into coincidence with the electric field 26.

Therefore, the result is a wide viewing angle that ranges from about 80 to 85 degrees in up-and-down and left-and-right sides from a line vertical to the IPS-LCD panel, for example.

FIG. 2 is a plan view illustrating one pixel of an array substrate according to a related art IPS-LCD device. As shown, gate lines 40 are transversely arranged and data lines 42 are disposed substantially perpendicular to the gate lines 40. A common line 50 is also transversely arranged parallel with the gate line 40 and is spaced apart from the gate line 40. The gate line 40, the common line 50 and a pair of the data lines 42 define a pixel region P on the array substrate. A thin film transistor (TFT) is disposed a corner of the pixel region P near the crossing of the gate and data lines 40 and 42.

In each one pixel P, three common electrodes 44 extend perpendicularly from the common line 50, and two of the common electrodes 44 are disposed next to the data lines 42, respectively. A pixel connecting line 48 is disposed next to the gate line 40 with being parallel with the gate line 40, and is electrically connected to the TFT T. Pixel electrodes 46 extend perpendicularly from the pixel connecting line 48 toward the common line 50. Each of the pixel electrodes 46 is disposed between two of the common electrodes 44 parallel with the data line 42. Each of areas "I" between the respective common electrodes 44 and the respective pixel electrodes 46 is defined as a block where the liquid crystal molecules are rearranged by the electric fields generated between the common and pixel electrodes 44 and 46. In FIG. 2, there are four blocks in one pixel.

As shown in FIG. 2, the IPS-LCD device according to the related art rearranges and operates the liquid crystal molecules using the electric field generated parallel with the array substrate. Thus, it can provide a wider viewing angle than the LCD device forming the electric field perpendicular to the array substrate. Some further modifications have been developed in the IPS-LCD device in order to further increase the viewing angle.

FIG. 3 is a plan view of an array substrate for use in an IPS-LCD device having multiple domains according to another related art. With reference to FIG. 3, some of detailed explanations, especially previously explained with reference to FIG. 2, will be omitted in order to prevent duplicate explanations.

In FIG. 3, a pixel connecting line 58 is disposed over a common line 60. Common and pixel electrodes 54 and 56 are elongated from the common and pixel connecting lines 60 and 58, respectively, in an up-and-down direction. Both the common and pixel electrodes 54 and 56 have a zigzag shape with plural bent portions, and they are parallel to each other and arranged alternately. The zigzag shape defines the multidomains in the pixel regions which are symmetrical to the bent portions of the common and pixel electrodes 54 and 56. These zigzag shaped structures and the multidomains improve the viewing angle further that the straight shape of FIG. 2.

Moreover in FIG. 3 the pixel connecting line 58 overlaps the common line 60 so that an overlapped area becomes a storage capacitor CST. Namely, the pixel connecting line 58 acts as one electrode of the storage capacitor CST, while the overlapped portion of the common line 60 acts as the other electrode of the storage capacitor CST. One of the pixel electrodes 56 is connected to a drain electrode 62 so that all of the pixel electrodes 56 can electrically communicate with the TFT T.

However, the IPS-LCD device having the above-mentioned multidomains has a problem in that colors shift depending on the viewing angles, due to the liquid crystal molecules have long and thin shapes.

FIG. 4 is a graph illustrating viewing angle properties of the IPS-LCD device having the zigzag structure of FIG. 3. The IPS-LCD device having the zigzag-shaped common and pixel electrodes can have the improved viewing angles in directions of ±90 and ±180 degrees, i.e., in right-and-left and up-and-down directions, as illustrated by references "IVa" and "IVb" in FIG. 4. However, the viewing angles are degraded in directions of ±45 and ±135 degrees, i.e., in diagonal directions, as illustrated by references "IVc" and "IVd" in FIG. 4. Furthermore, color shift also occurs depending on the viewing angles or directions.

When the voltages applied to the electrodes generate the electric fields between the common and pixel electrodes, the liquid crystal molecules rotate about degrees in accordance with the electric fields. Gray inversion occurs due to the rotation of the liquid crystal molecules. In particular, when the IPS-LCD is operated in gray mode, the IPS-LCD produces yellowish color in 45(+45) degrees declination with respect to the liquid crystal polarization because of the optical anisotropy properties of liquid crystal molecules. And the IPS-LCD also produces bluish color in 135(−45) degrees declination with respect to the liquid crystal polarization because of the optical anisotropy properties of the liquid crystal molecules.

SUMMARY OF THE INVENTION

Accordingly, the present invention is directed to an array substrate for an IPS-LCD device that substantially obviates one or more of the problems due to limitations and disadvantages of the related art.

An advantage of the present invention is to provide an array substrate for use in an IPS-LCD device, which increases a viewing angle and prevents a color sift.

Another advantage of the present invention is to provide an array substrate for use in an IPS-LCD device, which maintains uniform direction of liquid crystal molecules in all directions.

Another advantage of the present invention is to provide an array substrate for use in an IPS-LCD device, which increases an aperture area in a pixel region.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides an array substrate for use in an in-plane switching liquid crystal display device. The array substrate includes a plurality of gate lines disposed in a first direction on a substrate; a plurality of data lines disposed in a second direction aslant the gate lines, wherein the gate and data lines have rounded portions and pairs of the gate and data lines define circular pixel regions; a common line disposed in the first direction between the pair of the gate lines; a circular common electrode connected to the common line; a thin film transistor disposed near each crossing of the gate and data lines; and a circular pixel electrode disposed in the circular pixel region, connected to the thin film transistor, and spaced apart from the circular common electrode.

In another aspect, an array substrate for use in an in-plane switching liquid crystal display device includes a plurality of gate lines disposed in a first direction on a substrate; a plurality of data lines disposed in a second direction perpendicular to the gate lines, wherein the gate and data lines have a straight line shape and pairs of the gate and data lines define a rectangular pixel regions; a circular common electrode disposed in each rectangular pixel region; a common line disposed to the first direction, the common line connecting the circular common electrode to the neighboring circular common electrode disposed in the neighboring rectangular pixel region; a circular pixel electrode disposed inside the circular common electrode with being spaced apart from the circular common electrode; a thin film transistor disposed near a crossing of the gate and data lines in the rectangular pixel region; and a pixel connecting line connecting the circular pixel electrode to the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

In the drawings.

DETAILED DESCRIPTION OF THE ILLUSTRATED EMBODIMENTS

Reference will now be made in detail to an illustrated embodiment of the present invention, examples of which are shown in the accompanying drawings. Wherever possible, similar reference numbers will be used throughout the drawings to refer to the same or similar parts.

Figure 1:
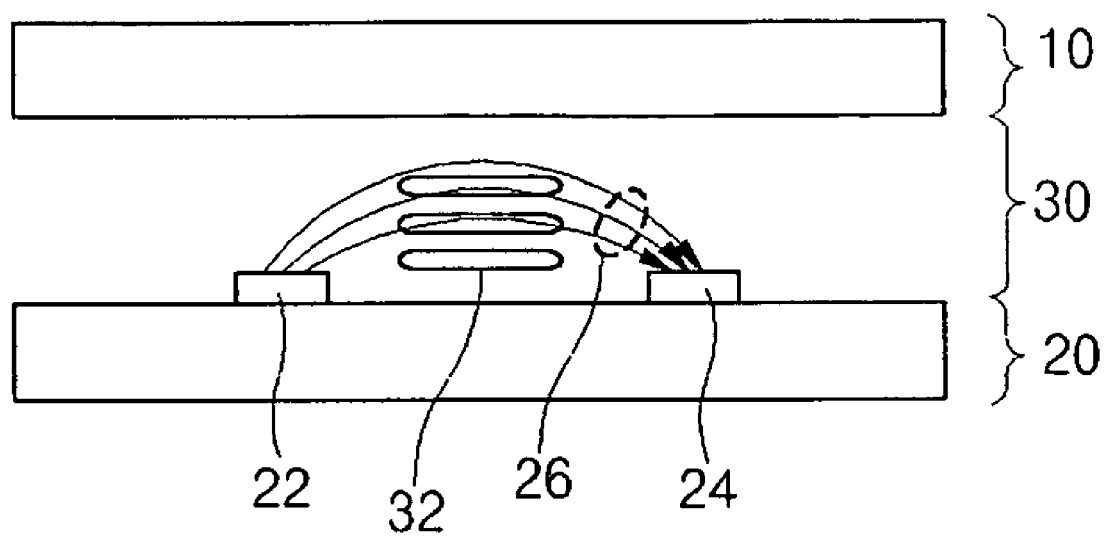
FIG. 1 is a schematic cross-sectional view illustrating a concept of a related art IPS-LCD panel.
Figure 2:
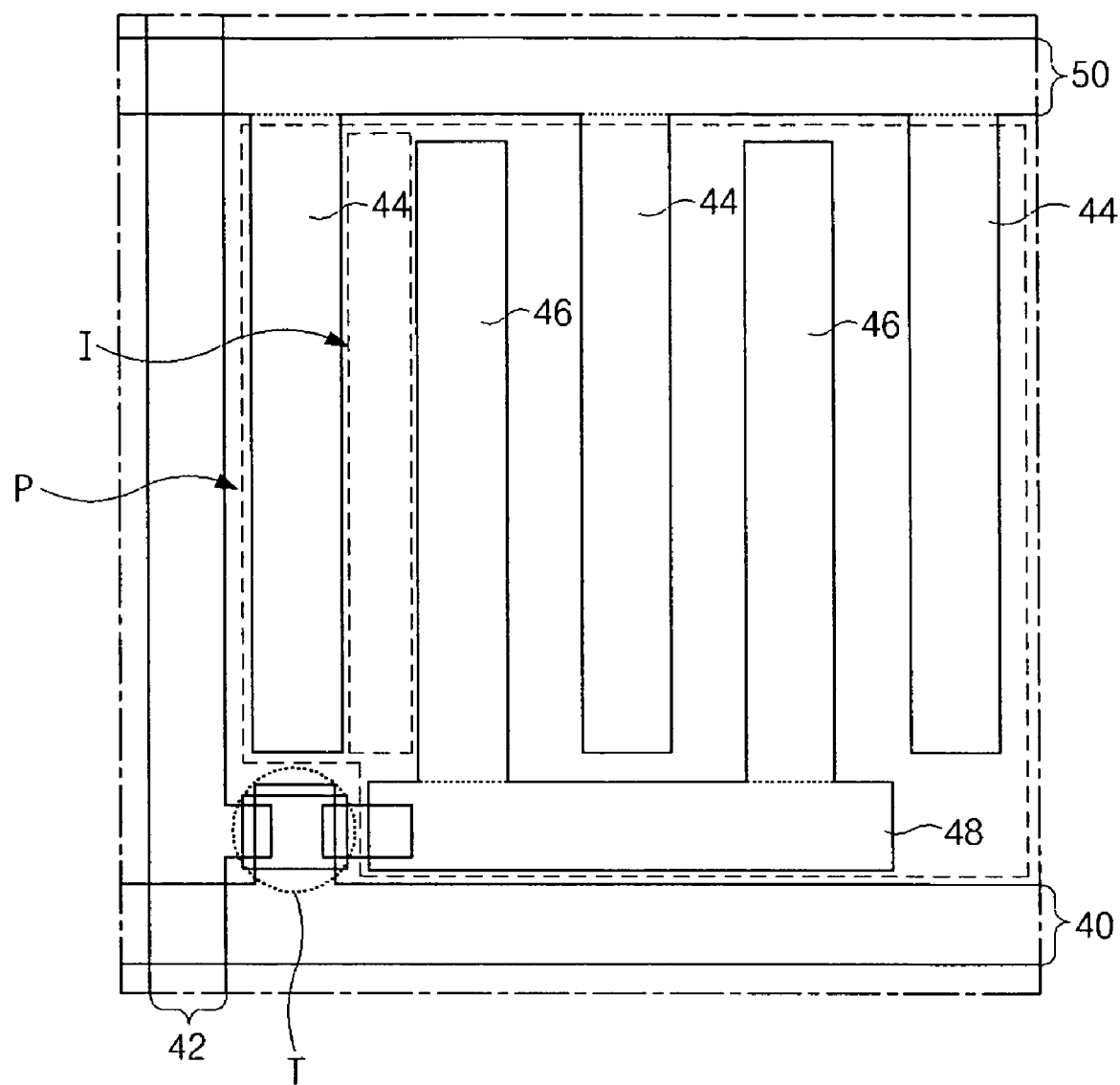
FIG. 2 is a plan view illustrating one pixel of an array substrate according to a related art IPS-LCD device.
Figure 3:
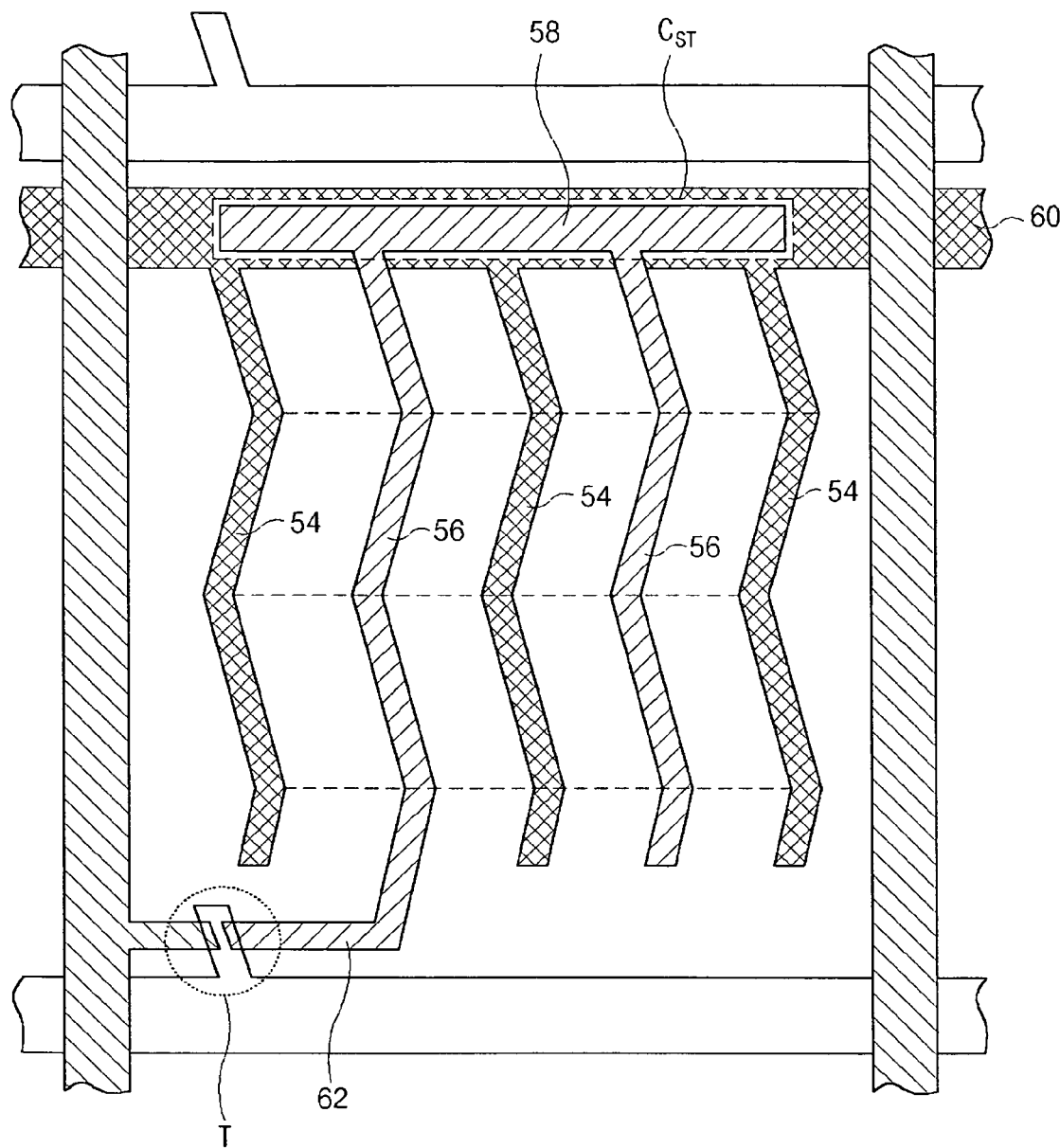
FIG. 3 is a plan view illustrating an array substrate for use in an IPS-LCD device having multiple domains according to another related art.
Figure 4:
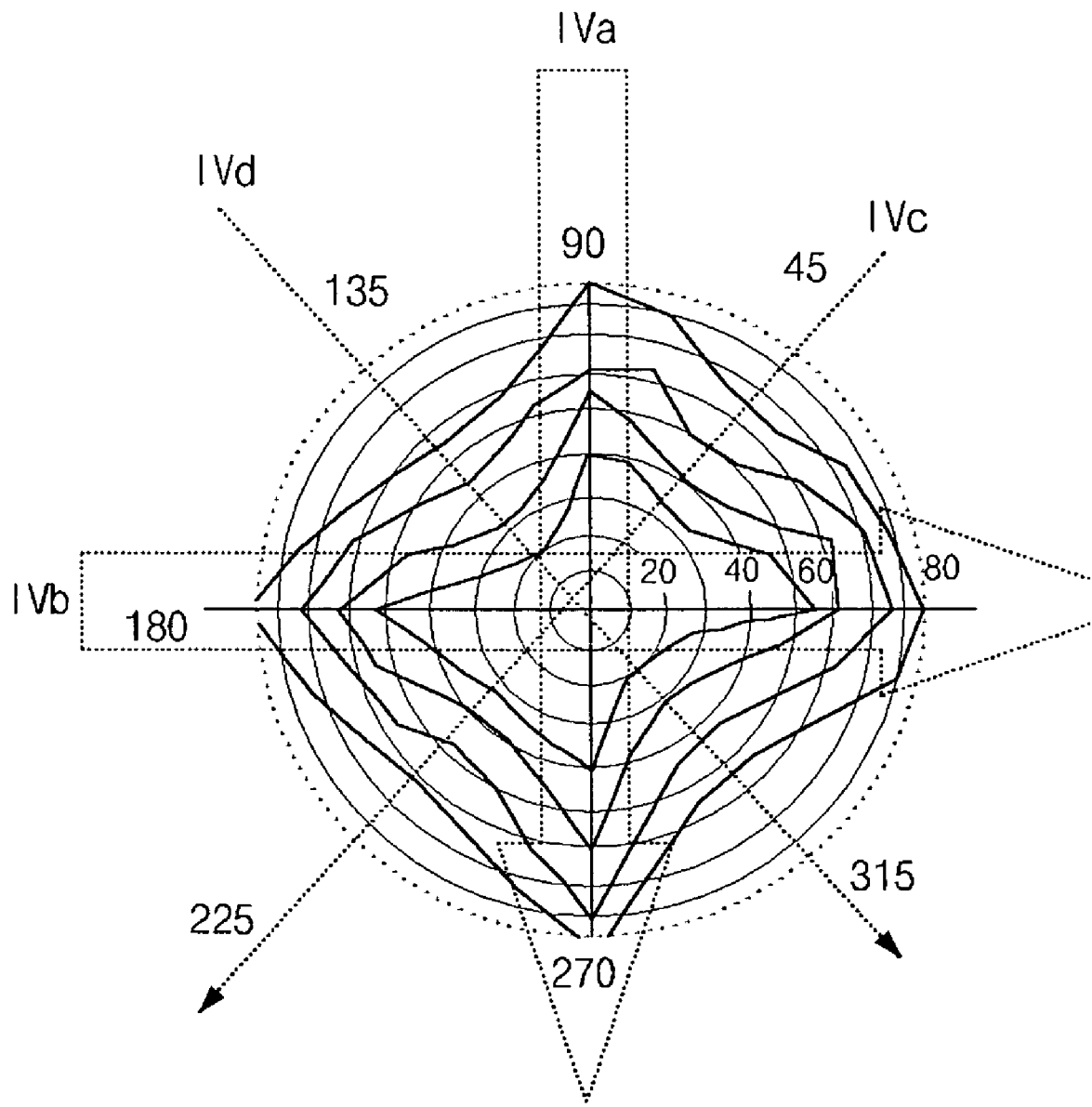
FIG. 4 is a graph illustrating a viewing angle of the IPS-LCD device having the zigzag structure of FIG. 3.
Figure 5:
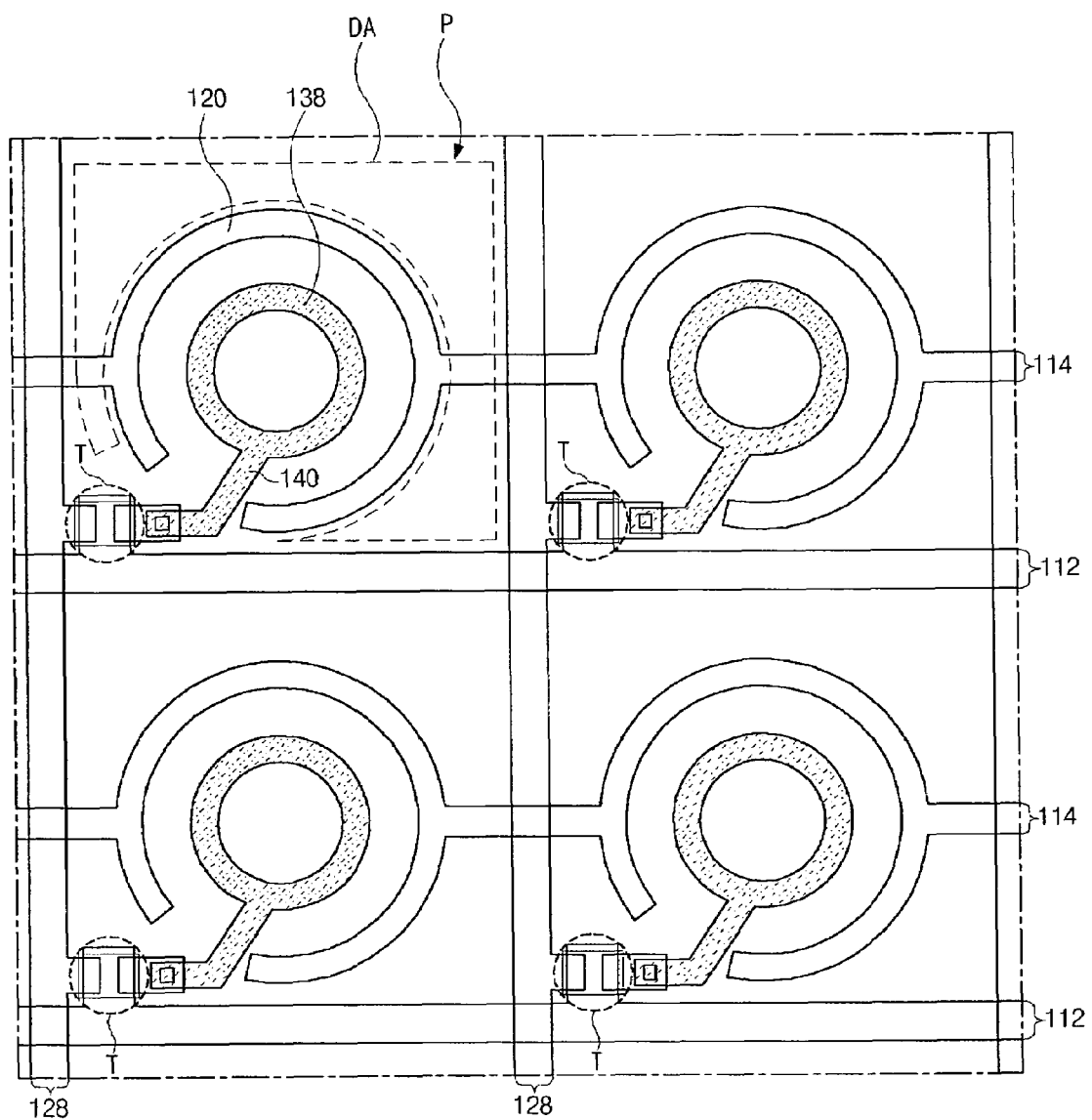
FIG. 5 is a plan view illustrating an array substrate for use in an IPS-LCD device according a first embodiment of the present invention.

FIG. 5 is a plan view illustrating an array substrate for use in an IPS-LCD device according to a first exemplary embodiment of the present invention. In the present invention, the common and pixel electrodes have a substantially circular shape.

As shown in FIG. 5, gate lines 112 are transversely arranged and data lines 128 are disposed substantially perpendicular to the gate lines 112. Pairs of gate and data lines 112 and 128 define regions P on the array substrate. A thin film transistor (TFT) T is disposed near each crossing of the gate and data lines 112 and 128 such that each pixel P includes one TFT T. Namely, each of the pixels P has the TFT at a bottom left corner thereof. The gate and data lines 112 and 128 act as borders of neighboring pixels P.

In the pixel region, a substantially circular common electrode 120 having a substantially circular band shape is disposed. The circular common electrode 120 in one pixel P is connected to the neighboring circular common electrode disposed in the neighboring pixel. Namely, a common line 114 substantially perpendicularly crosses the data line 128 and connects the neighboring circular common electrodes 120. A circular pixel electrode 138 is disposed inside the circular common electrode 120 and spaced apart from the circular common electrode 120. The pixel electrode 138 also has a circular band shape and is connected to the TFT T through a pixel connecting line 140. Namely, the pixel connecting line 140 extends from a side of the circular pixel electrode 138 and contacts the TFT to transfer the electric signals from the TFT T to the pixel electrode 138.

An aperture area defined between the circular common and pixel electrodes 120 and 138 also has a circular band shape such that the liquid crystals located in such aperture area have the liquid crystal directors that are constant in all directions. Therefore, a color shift is prevented and an image quality increases in the IPS-LCD device. Additionally, although FIG. 5 shows only one common electrode and one pixel electrode in the pixel region P, plural common and pixel electrodes are possible so as to form multi domains within one pixel region P.

Figure 7:
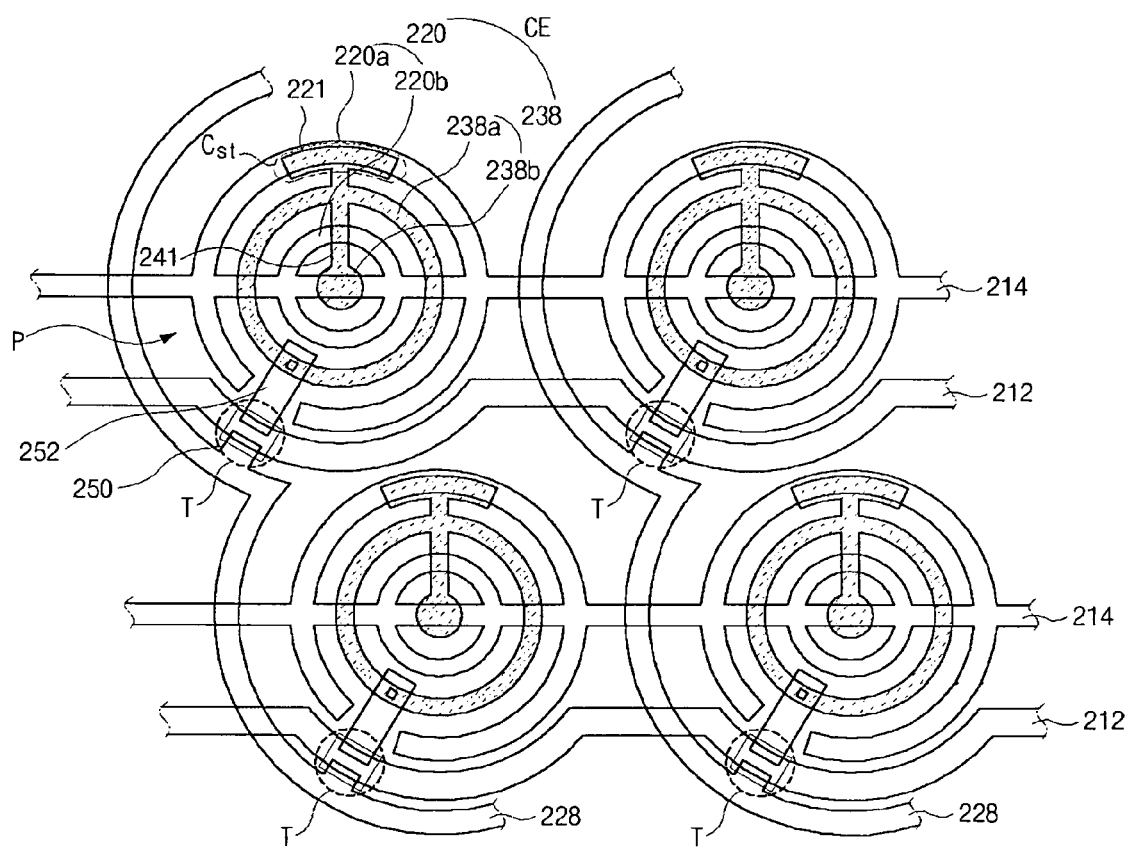
FIG. 7 is a plan view illustrating an array substrate for use in an IPS-LCD device according to a second embodiment of the present invention.

The array substrate depicted in FIG. 5 shows the gate and data lines 112 and 128 shaped like straight lines, and each of the pixel regions P defined by the gate and data lines 112 and 128 is shaped like a rectangle, for example, as being a box type. And circular common and pixel electrodes 120 and 138 are formed inside the rectangular pixel region P. Therefore, dummy areas DA, which do not function as the aperture area, exist in the pixel region P because of the profile differences between the rectangular pixel region P and the circular common and pixel electrodes 120 and 138. Those dummy areas DA cause the decrease of the aperture ration in the IPS-LCD device. To overcome this disadvantage, some modifications are developed as illustrated in FIG. 7.

Figure 6A:
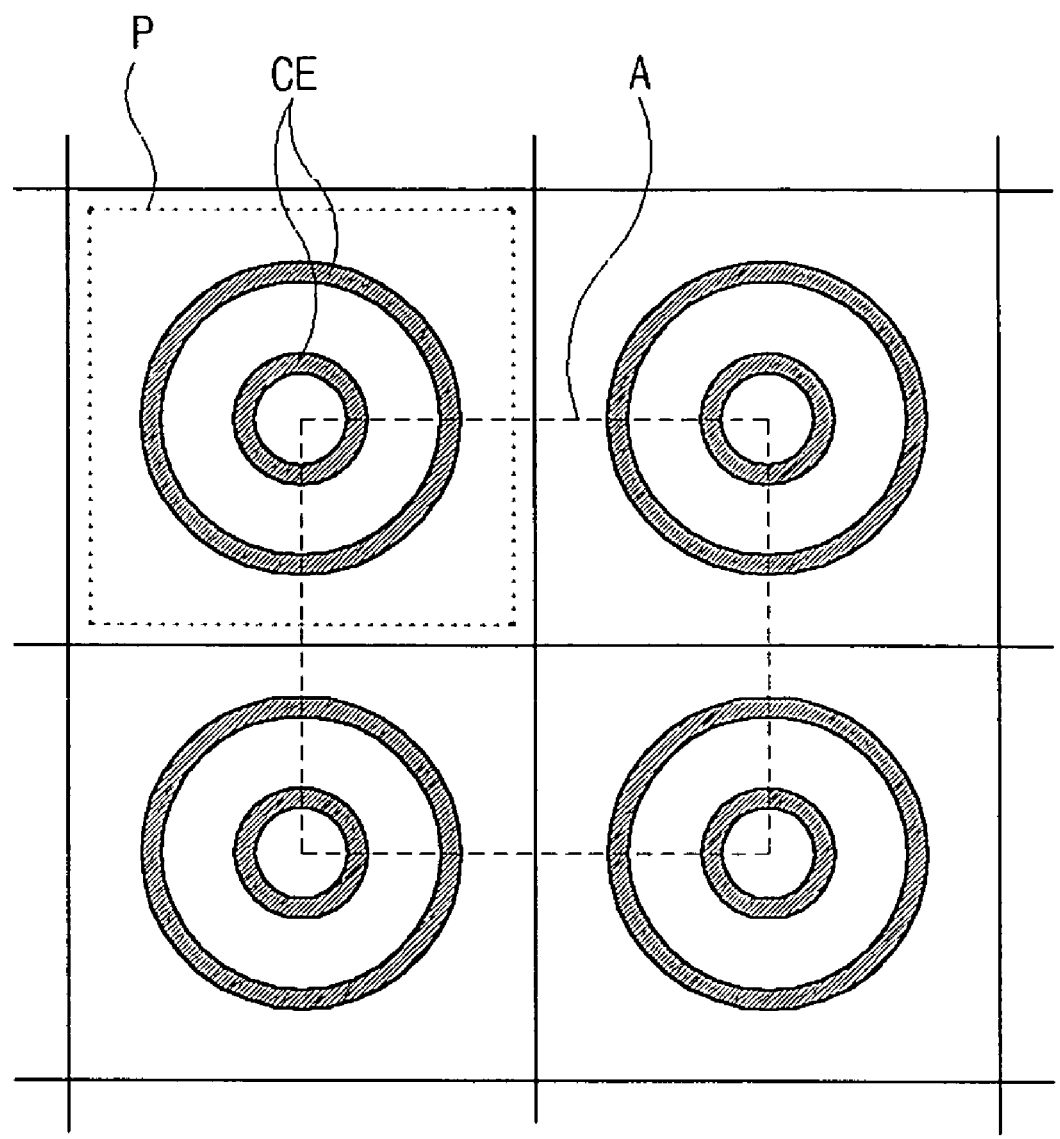
FIGS. 6A and 6B are conceptual illustrations illustrating an exemplary pixel arrangement of the IPS-LCD device having circular common and pixel electrodes according to the present invention.
Figure 6B:
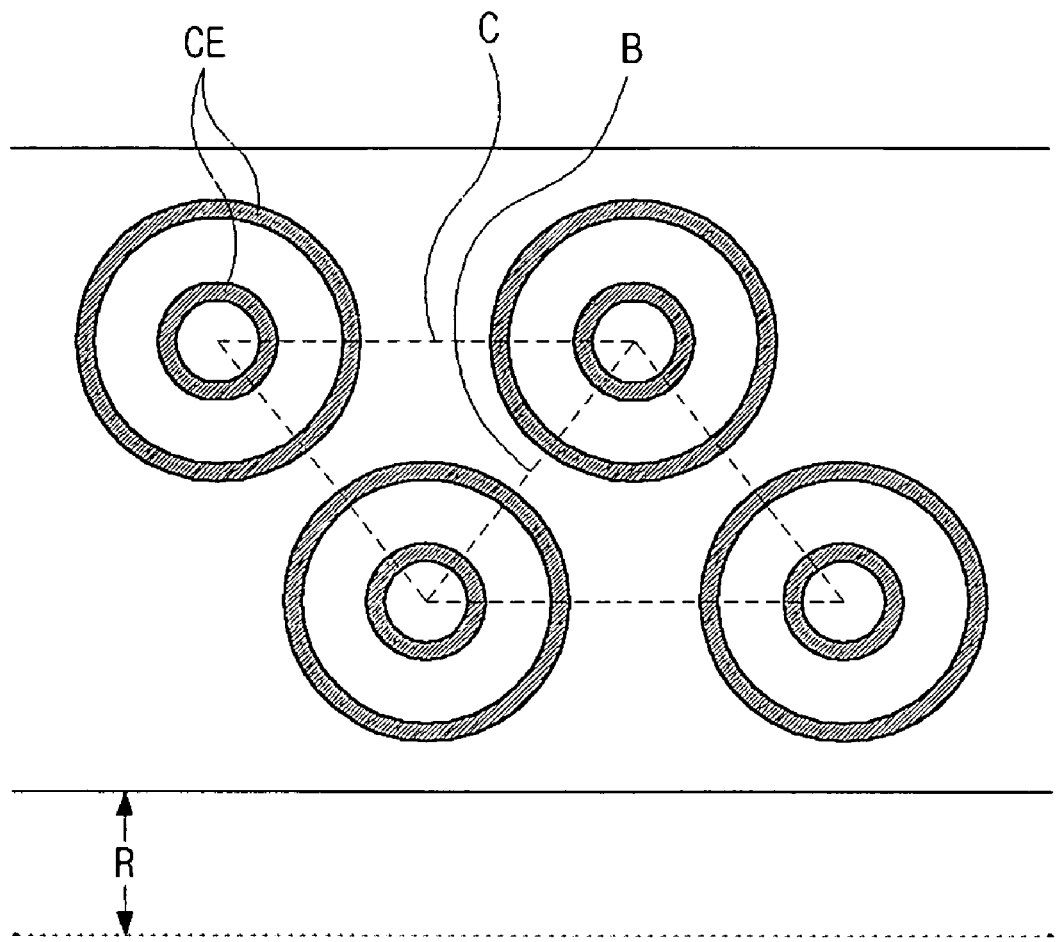

FIGS. 6A and 6B are conceptual illustrations showing exemplary pixel arrangements of the IPS-LCD device having circular common and pixel electrodes according to the present invention.

In FIG. 6A, each pixel region P has a rectangular shape and the circular common and pixel electrodes CE are disposed inside the rectangular pixel region P. Furthermore, if lines are drawn to connect the centers of the circular common and pixel electrodes CE, four pixel regions P form a rectangle A. This configuration can be referred to as a stripe structure because the pixel regions P are disposed parallel side-by-side alongside vertical or horizontal lines.

FIG. 6B shows a pixel arrangement modified from FIG. 6A. As compared to FIG. 6A, the pixel region of FIG. 6B is not shaped like a rectangle, but the common and pixel electrodes CE have a substantially circular shape and are disposed in the center of the pixel regions as like those of FIG. 6A. If lines are drawn to connect the centers of neighboring three pixel regions, a triangle B is accomplished. Further, if lines are drawn to connect the centers of neighboring four pixel regions, a parallelogram C is accomplished. This configuration forming the triangle or the parallelogram can be referred to as a delta structure or a parallelogram structure because of the above-mentioned profiles. The delta structure of FIG. 6B can reduce the intervals among the circular common and pixel electrodes CE, thereby reducing the dummy area as much as a residual area R in comparison with the stripe structure depicted in FIG. 6A. This means that the delta structure increases the aperture ratio relative to the stripe structure.

FIG. 7 is a plan view illustrating an array substrate for use in an IPS-LCD device according to a second exemplary embodiment of the present invention. In this second embodiment, the aforementioned delta structure is utilized in order to minimize the dummy area that does not function to display images.

Common lines 214 are transversely disposed on a substrate with being spaced apart from each other. Gate lines 212 are disposed in a row direction on the substrate while running from left to right in the context of the figure alongside the common lines 214. Data lines 228 are disposed in a column direction aslant the gate line 212. Pairs of the gate and data lines 212 and 228 define a pixel regions P. The gate and data lines 212 and 228 are curved in each pixel region P such that they are circuitous around the pixel regions P. Namely, the pixel regions P of the second embodiment are shaped like a circle unlike the first embodiment illustrated in FIG. 5 because the gate and data lines 212 and 228 are formed to be rounded around the pixel regions P.

Near each crossing of the gate and data lines 212 and 228, a thin film transistor (TFT) T is disposed. The TFT T includes a source electrode 250 and a drain electrode 252. The source electrode 250 extends from the data line 228 over a portion of the gate line 212. The drain electrode 252 is spaced apart from the source electrode 250, overlaps a portion to the gate line 212, and extends into the pixel region P.

Within each pixel region P, a circular common electrode 220 and a circular pixel electrode 238 are disposed. The circular common electrode 220 includes a first circular common electrode pattern 220a and a second circular common electrode pattern 220b both of which extend from and are connected to the common line 214. The common line 214 passes along a diameter of the first and second circular common electrode patterns 220a and 220b such that the common line 214 divides the first and second circular common electrode patterns 220a and 220b into two semicircular portions, respectively. The first circular common electrode pattern 220a is larger than the second circular common electrode pattern 220b such that the second circular common electrode pattern 220b is disposed inside the first circular common electrode pattern 220a. Meanwhile, the first circular common electrode pattern 220a has an opening in order to prevent the intersection with the drain electrode 252.

The circular pixel electrode 238 is comprised of first and second circular pixel electrode patterns 238a and 238b. The first circular pixel electrode pattern 238a is shaped like a circular band and is disposed between the first and second circular common electrode patterns 220a and 220b. The second circular pixel electrode pattern 238b is disposed inside the second circular common electrode pattern 220b. A pixel connecting line 241 connects the first and second circular pixel electrode patterns 238a and 238b, and extends over a portion of the first circular common electrode pattern 220a.

Meanwhile, a capacitor electrode 221 is disposed over a portion of the first circular common electrode pattern 220a and is connected to the pixel connecting line 241. The capacitor electrode 221 and the overlapped portion of the first circular common electrode pattern 220a constitute a storage capacitor Cst with an interposed dielectric layer (not shown). The capacitor electrode 221 acts as a first electrode of the storage capacitor Cst, and the overlapped portion of the first circular common electrode pattern 220a acts as a second electrode of the storage capacitor Cst. Although FIG. 7 shows that the capacitor electrode 221 is disposed over the first circular common electrode pattern 220a, the capacitor electrode 221 maybe disposed over the previous gate line 212 disposed for the previous pixel regions P. The first circular pixel electrode pattern 238a is connected to the drain electrode 252 such that it receives data signals from the data line 228 via the TFT T.

In the pixel region P shown in FIG. 7, the aperture areas between the electrode patterns are shaped like circles because the common and pixel electrode patterns 220a, 220b, 228a and 228b have the circular shapes. Furthermore, since the gate and data lines 212 and 228 have found portions corresponding to the circular common and pixel electrodes 220 and 228, the pixel regions P also have the circular shape.

According to the second embodiment of FIG. 7, the pixel regions P have the formation of the delta structure or the parallelogram structure as illustrated with reference to FIG. 6B. Namely, the pixel regions are distributed parallel from left to right in the context of the figure, but obliquely from top and bottom in the context of the figure. When drawing the lines to connect the centers of the three pixel regions P, the lines form like a letter delta (Δ), i.e., the delta structure. Also, when drawing the lines to connect the centers of the four pixel regions P, the lines form a parallelogram, hence the parallelogram structure. The circular pixel regions and the delta or parallelogram structure can reduce the dummy area as compared to with the stripe structure of FIG. 5, because the circular pixel regions P are closely located to each other. Therefore, the aperture ratio can increase.

Further embodiments are contemplated by the present invention in which pixels, pixel electrodes, and common electrodes have a polygonal shape rather than a circular band shape. For example, pixels may have the shape of polygons having five or more sides. It is understood that as the number of sides in the regular or equilateral polygon increases, the polygonal shape approaches a substantially circular shape.

Accordingly in the present invention, it is possible to obtain a wider viewing angle due to the circular-common and pixel electrodes. The color shift is also prevented, and the contrast and resolution of the IPS-LCD increases due to the fact that the liquid crystal directors are all uniform in all directions. Furthermore, since the dummy area is reduced when the pixel regions are rounded and the delta or parallelogram structure is utilized, the aperture ratio increases.

It will be apparent to those skilled in the art that various modifications and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. An array substrate for use in an in-plane switching liquid crystal display device, comprising:
    a plurality of gate lines disposed in a first direction on a substrate;
    a plurality of data lines disposed in a second direction perpendicular to the gate lines, wherein the gate and data lines have a straight line shape and pairs of the gate and data lines define a rectangular pixel regions;
    a circular common electrode disposed in each rectangular pixel region;
    a common line disposed to the first direction, the common line connecting the circular common electrode to the neighboring circular common electrode disposed in the neighboring rectangular pixel region;
    a circular pixel electrode disposed inside the circular common electrode with being spaced apart from the circular common electrode;
    a thin film transistor disposed near a crossing of the gate and data lines in the rectangular pixel region; and
    a pixel connecting line connecting the circular pixel electrode to the thin film transistor,
    wherein the thin film transistor is disposed at a corner of the pixel region and wherein the distance between the common line and two adjacent gate lines is substantially the same.

2. The array substrate of claim 1, wherein the circular pixel electrode has a circular band shape.

3. The array substrate of claim 1, wherein the circular common electrode has an open corresponding in position to the thin film transistor, and the pixel connecting line passes through the open.

4. The array substrate of claim 1, wherein the pixel connecting line does not cross the rectangular pixel region but cross over the gate line.

5. The array substrate of claim 1, wherein the circular common and pixel electrodes constitute a circular aperture area.

6. The array substrate of claim 1, wherein the pixel regions have a formation of straight structure where the pixel regions are distributed parallel both from left to right and from top and bottom.

7. The liquid crystal display device of claim 1, wherein first and second adjacent pixels in a first row and a third pixel adjacent to said first and second pixels in a second row form a delta structure, each of three vertices of the delta structure being a center of the first, second and third pixels, respectively.

* * * * *